Dec. 17, 1963 R. R. HAGER 3,114,241
HYDRAULIC REACTION TYPE CONTROL VALVE FOR HYDROVACS AND AIR-PAKS
Filed Oct. 13, 1960
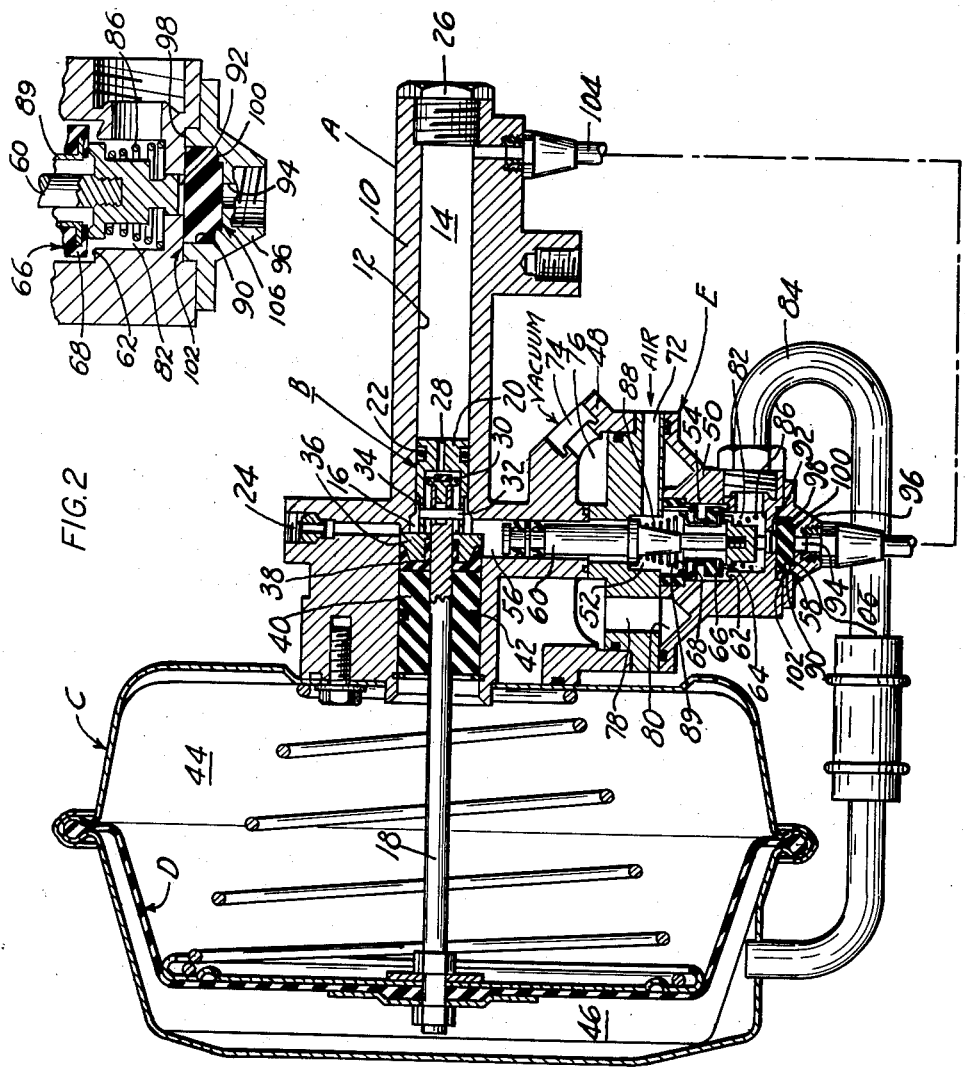
INVENTOR.
ROBERT R. HAGER
BY
William P. Hickey
ATTORNEY

United States Patent Office 3,114,241
Patented Dec. 17, 1963

3,114,241
HYDRAULIC REACTION TYPE CONTROL VALVE
FOR HYDROVACS AND AIR-PAKS
Robert R. Hager, South Bend, Ind., assignor to The
Bendix Corporation, a corporation of Delaware
Filed Oct. 13, 1960, Ser. No. 62,401
2 Claims. (Cl. 60—54.5)

The present invention relates to means for transforming fluid pressure forces to mechanical movements; and more particularly to reaction producing structures which will provide mechanical forces which are generally proportional to fluid pressures and vice versa.

An object of the present invention is the provision of new and simplified means for actuating mechanical parts by means of fluid pressure.

Another object of the present invention is the provision of a new and simplified control valve for balancing input and output fluid pressures.

A still further object of the present invention is the provision of a new and improved fluid pressure intensifying unit having new and improved means utilizing output pressure for moving the control valve to its neutral position.

The invention resides in certain constructions, and combinations and arrangements of parts; and further objects and advantages of the invention will become apparent to those skilled in the art to which the invention relates from the following description of the preferred embodiment shown in the drawings in which: FIGURE 1 is a cross sectional view of a hydraulic fluid pressure intensifying device of the general type shown in the Earl R. Price Patent No. 2,654,294 embodying my invention; and FIGURE 2 is a larger cross sectional detail of my device as utilized in FIGURE 1.

The fluid pressure intensifying unit shown in the drawing generally comprises a fluid pressurizing cylinder A having a housing 10 in which is formed a cylinder chamber 12 which is divided into an output chamber 14 and a follow-up chamber 16 by means of a movable wall or hydraulic piston B. The hydraulic piston B is adapted to be driven into the output chamber 14 by means of a fluid pressure motor C, which fluid pressure motor has a movable wall or power diaphragm D that is connected to the hydraulic piston B by means of a push rod 18. The fluid pressure motor C may be of any suitable type and as shown in the drawing is of the type which uses vacuum to atmospheric pressure differential. The motor corresponds generally in construction and operation to that shown in the Earl R. Price patent previously referred to. As explained in the Price patent the type of fluid pressure intensifying unit referred to is normally used power to actuate the hydraulic braking system of an automotive vehicle; and the vacuum used to actuate the fluid pressure motor C is obtained from the manifold of the vehicles propelling engine. Control of the fluid pressure motor C is had by means of the control valve E which regulates the vacuum to air differential across the power diaphragm D.

The hydraulic piston B is a generally cup-shaped structure 20 having an O-ring 22 in its periphery for forming a hydraulic pressure seal with respect to the sidewalls of the cylinder chamber 12. The hydraulic control signal from the master cylinder (not shown) of the vehicles braking system is communicated to the follow-up chamber 16 by means of the inlet connection 24; and in order that compensation can be had for changes in volume of the output system that is connected to the outlet connection 26 for the output chamber 14 a compensating passage 28 is provided through the cup-shaped structure 20. The end of the push rod 18 is provided with a suitable poppet member 30 for closing off the compensating passageway 28 during power actuation of the unit; and the push rod 18 and cup-shaped structure 20 are so connected as to open the compensating passage 28 when the hydraulic piston B is in its normal retracted position shown in the drawing. The end of the push rod 18 is connected to cup-shaped structure 20 by means of a cross pin 32 fixed to the push rod 18, and the opposite end portions of the pin are slidingly received in a slotted hole 34 in the sidewall portions of the cup-shaped structure 20. During retractile movement of the push rod 18, hydraulic pressure in the output chamber 14 causes the hydraulic piston B to move rearwardly until the outer end of the cup-shaped structure 20 abuts a suitable stop or seal retainer 36 positioned adjacent the outer end of the cylinder chamber 12. Further retractile movement of the push rod 18 pulls the poppet away from the bottom end of the cup-shaped structure 20 to open the port 28. The outer end of the cylinder chamber 12 is of course closed off by the usual cup-shaped seal 38 which surrounds the push rod 18 and is held against the seal retainer 36 by means of a suitable spacer member 40, and snap ring 42.

The fluid pressure motor C shown in the drawing is of the normally vacuum submerged type in which the opposing power chambers 44 and 46 on the front and rear sides of the movable wall or diaphragm D are normally supplied with vacuum of equal intensity. The movable wall or diaphragm D is power actuated by the flow of air pressure to the rear opposing power chamber 46; and the control of pressure, the rear opposing power chamber 46 is of course had by means of the control valve E. The control valve E is formed by means of intermediate and outer cover members 48 and 50 respectively having openings 52 and 54 therethrough which are generally aligned with a hydraulic chamber 56 which communicates with the follow-up chamber 16 in the housing 10. A suitable reaction chamber 58 is positioned in the outer end of the outer cover member 50 generally aligned with the openings 52, 54 and 56; and a control member 60 is positioned in the chambers with its opposite ends extending into the hydraulic chamber 56 and into the reaction chamber 58. The opening 54 is generally stepped to provide a shoulder or vacuum valve seat 62 which faces inwardly or towards the hydraulic chamber 56; and the control member 60 is also provided with a shoulder or atmospheric valve seat 64 which is positioned generally concentric with the vacuum valve seat 62. Flow past each of the valve seats is controlled by an annular poppet member 66 which is adapted to abut each of the valve seats. The annular poppet member 66 includes a flexible diaphragm portion 68 the outer periphery of which is sealingly clamped to the sidewalls of the central opening 54 in the intermediate cover member 48. Atmospheric pressure is continually communicated to the region internally of the diaphragm 68 by means of the passage 72 in the cover member 48, and vacuum is continually communicated to the region radially outwardly of the annular diaphragm portion 68 by means of the vacuum connection 74, annular passage 76, as well as passages 78 and 80. The region axially outwardly of the valve seats 62 and 64 forms the control chamber 82 of the valve, and the control chamber 82 is continually communicated to the rear power chamber 46 by means of the control tube 84. The atmospheric valve seat 64 is normally biased against the poppet member 66 by the valve return spring 86 with sufficient force to lift the poppet member 66 out of engagement with the vacuum valve seat 62; so that vacuum will be normally communicated to the rear opposing power chamber 46. A small opposing coil spring 88 is positioned against a stiffening sleeve 89 for the poppet 66 to provide a slight sealing force between the poppet 66 and atmospheric valve seat 64 to assure that a suitable seal will be provided at all times.

As previously indicated a reaction chamber 58 is provided adjacent the outer end of the control member 60 to provide a reaction force which biases the control member 60 inwardly toward its deenergized condition shown in the drawing with a force generally proportional to the output force of the servo motor. According to principles of the present invention, applicant has found that the hydraulic output pressure of the servo motor unit can be translated into a corresponding mechanical force by means of a single block of elastomeric material which will at the same time form its own seal in its receiving chamber. Applicant has found that once a seal is initially established, hydraulic pressure exerted upon the reaction disc will not disrupt the seal even though a considerable amount of the elastomeric material of which the reaction disc is formed is forced out of the reaction chamber. The reaction chamber 58 shown in the drawing is formed in three portions which consist of a large diameter portion 90 that is interpositioned between opposite small first and second diameter portions 92 and 94 respectively. The small diameter portion 92 is formed by a small diameter continuation of the central opening 54 in the outer cover member; and the large diameter portion 90 and second small diameter portion 94 are formed by a counterbore in a small cap 96 which is suitably affixed to the outer end of the outer cover member 50. The large diameter portion 90 of the reaction chamber has a diameter greater than the first portion 92 so as to provide one end face or shoulder 98 for the chamber 90, and the stepped bore in the cap 96 forms a second end face or shoulder 100 for the opposite end of the chamber 90. A disc or block of an elastomeric material 102 which is sufficiently resilient to flow under pressure is positioned in the large diameter portion 90 of the reaction chamber for the purpose of transforming pressure forces from the output chamber 14 into mechanical movement of the control member 60. The outer end of the control member has a snug sliding fit in the first small diameter chamber portion 92; and a suitable conduit 104 communicates the chamber 14 with the second small diameter chamber portion 94 positioned outwardly of the disc 102. The disc 102 may be of any suitable elastomeric material and as shown in the drawing is made of a synthetic rubber such as neoprene.

According to further principles of the invention applicant has found that for most instances a radial compression of the reaction disc 102 as provided by for example, an interference fit between the rubber disc 102 and the chamber portion 90 does not provide an adequate pressure seal. Applicant has further found that an axial compression of the outer periphery of the disc between the shoulders 98 and 100 will provide an adequate initial seal for low fluid pressures; and that a subsequent buildup in fluid pressure in the chamber portion 94 forces the disc 102 against the shoulder 98 with sufficient force as to maintain as seal—even though some of the material of the disc 102 has been forced into the first small diameter chamber portion 92 so that the disc 102 no longer fills the large diameter portion 90 of the reaction chamber. The seal provided by this reaction structure has proven complete with substantially no leakage past the reaction disc 102; and this total sealing feature of the disc has been entirely unexpected and unanticipated. In the preferred embodiment shown in the drawing, the initial axial deformation of the reaction disc 102 is provided by a slight raised face 106 around the outer periphery of the second shoulder 100; so that the initial small axial sealing force is applied to only a small section of the reaction disc; and so that the cap 96 can be easily drawn into place against the outer cover member 50.

The operation of the unit shown in the drawing is initiated by supplying pressure from the master cylinder into the inlet connection 24. The pressure thence flows through the follow-up chamber 16 to the hydraulic chamber 56 where the pressure is then exerted upon the end of the control member 60. In the normal condition of the servo motor shown, the poppet member 66 is away from the vacuum valve seat 62; so that vacuum from the manifold of the propelling engine, and which is connected to the vacuum connection 74, is simultaneously connected to the front opposing power chamber 44, and also to the rear opposing power chamber 46 by means of the open valve seat 62 and control tube 84. A buildup in hydraulic pressure in the hydraulic chamber 56 causes the control member 60 to move forwardly until the poppet member 66 abuts the vacuum valve seat 62 to close off further vacuum communication to the rear opposing power chamber 46. A slight further outward movement of the control member 60 causes the atmospheric valve seat to thereafter lift clear of the poppet member 66 so that air pressure will flow through the annular poppet member 66 to the rear opposing power chamber 46 to actuate the diaphragm D. Forward movement of the diaphragm D causes the end 30 of the push rod 18 to close off the compensating port 28, and thereafter move the hydraulic piston D forwardly in the hydraulic cylinder 12 to force fluid out of its outlet connection 26. At the same time, the pressure that is generated in the output chamber 14 flows through the conduit 104 to the second small diameter portion 94 of the reaction chamber 58 to exert a hydraulic force against the outer face of the reaction disc 102. The precompression of the outer periphery of the reaction disc 102 of course forms an initial seal preventing flow of the hydraulic fluid past the disc 102 and subsequent buildup in hydraulic pressure in the outer chamber portion 94 causes the elastomeric material of the reaction disc 102 to be pressurized and deformed into the first small diameter portion 92 up against the end of the control member 60. It has been found that this deformation in flow of the reaction disc 102 does not destroy the initial seal provided by the initial precompression of the outer periphery of the reaction disc 102 even though the material flows away from the second or outer shoulder 100—nor does the hydraulic pressure flow around the periphery of the disc to leak past the disc 102.

As the pressure in the output chamber 14 increases, the disc 102 becomes correspondingly pressurized to apply a proportional inward or deenergizing force to the end of the control member 60. This causes the atmospheric poppet 64 to again abut the poppet member 66 and prevent further flow of the air pressure to the rear opposing power chamber 46 and thereby prevent a further buildup of pressure in the output chamber 14. Further buildup of pressure in the output chamber 14 is thereby prevented and the brakes of the vehicle are held applied with a pressure which is greater than and generally proportional to the hydraulic input pressure being supplied to the inlet connection 24. When it is desired to reduce the braking effort of the vehicle, a reduction in pressure to the inlet connection 24 permits the pressure in the output chamber 14 to deform the block 102 further into the small diameter chamber portion 92 to cause the atmospheric valve seat 64 to lift the poppet member 66 away from the vacuum valve seats 62. This causes a reduction in pressure in the rear opposing power chamber 46 which reduction continues until a reduced pressure in the output chamber 14 is established wherein the pressure forces across the control member 60 are equalized and the poppet member 66 is again brought into engagement with the vacuum valve seat 62. A complete reduction in pressure in the inlet connection 24 permits the valve return spring 82 to move the control valve into the position shown in the drawing, and a complete reduction of pressure thereby brought about in the output chamber 14.

It will be apparent that the objects heretofore enumerated as well as others have been accomplished; and that there has been provided an improved combination reaction and sealing structure for transforming hydraulic pressures into mechanical movements, and which is simple in construction, efficient in its operation, and inexpensive to manufacture.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

I claim:

1. In a reaction producing structure: a body member having a stepped chamber therein forming a first shoulder between generally axially aligned large diameter and small diameter chamber portions, a closure member for said large diameter portion of said chamber, a block of elastomeric material positioned against said shoulder and substantially filling said large diameter portion, a control member having an end portion in said small diameter chamber portion for abutment by said deformable block, first means communicating fluid pressure to said large diameter portion to bias said block against said shoulder, said block of elastomeric material being constructed and arranged to be deformed hydrostatically by said hydraulic pressure to maintain a seal against said shoulder and sidewalls of said chamber and also transmit force to said control member, said block returning to its original shape when hydraulic pressure is removed from said block, stationary abutment means for confining the periphery of said block against said shoulder when pressure is removed from said block and said block returns to its original shape, and means regulated by said control member for increasing pressure supplied by said first means against said block as said control member is moved toward said block of elastomeric material.

2. In a fluid pressure intensifying unit: a body member having a stepped chamber therein forming a first shoulder between generally axially aligned large diameter and small diameter chamber portions, a closure member for said large diameter portion of said chamber, a block of elastomeric material positioned against said shoulder and substantially filling said large diameter portion, a control member having an end portion in said small diameter chamber portion for abutment by said deformable block, a hydraulic fluid pressurizing device, a power unit for developing pressure in said fluid pressurizing device, means communicating pressure from said fluid pressurizing device to said large diameter chamber portion, a fluid pressure motor for forcing said control member toward said block, means controlled by said control member for actuating said power unit when said control member is moved from a normal position toward said block, and said block of elastomeric material being constructed and arranged to be deformed hydrostatically by said hydraulic perssure to maintain a seal against said shoulder and sidewalls of said chamber and also transmit force to said control member, said block returning to its original shape when hydraulic pressure is removed from said block.

References Cited in the file of this patent
UNITED STATES PATENTS

| | | |
|---|---|---|
| 2,665,179 | Salvatora | Jan. 5, 1954 |
| 2,685,172 | Price | Aug. 3, 1954 |
| 2,747,697 | Banker | May 29, 1956 |
| 2,870,606 | Stelzer | Jan. 27, 1959 |
| 2,904,960 | Aikman | Sept. 22, 1959 |
| 2,913,877 | Stelzer | Nov. 24, 1959 |
| 2,925,986 | Woods | Feb. 23, 1960 |